Patented Sept. 21, 1948

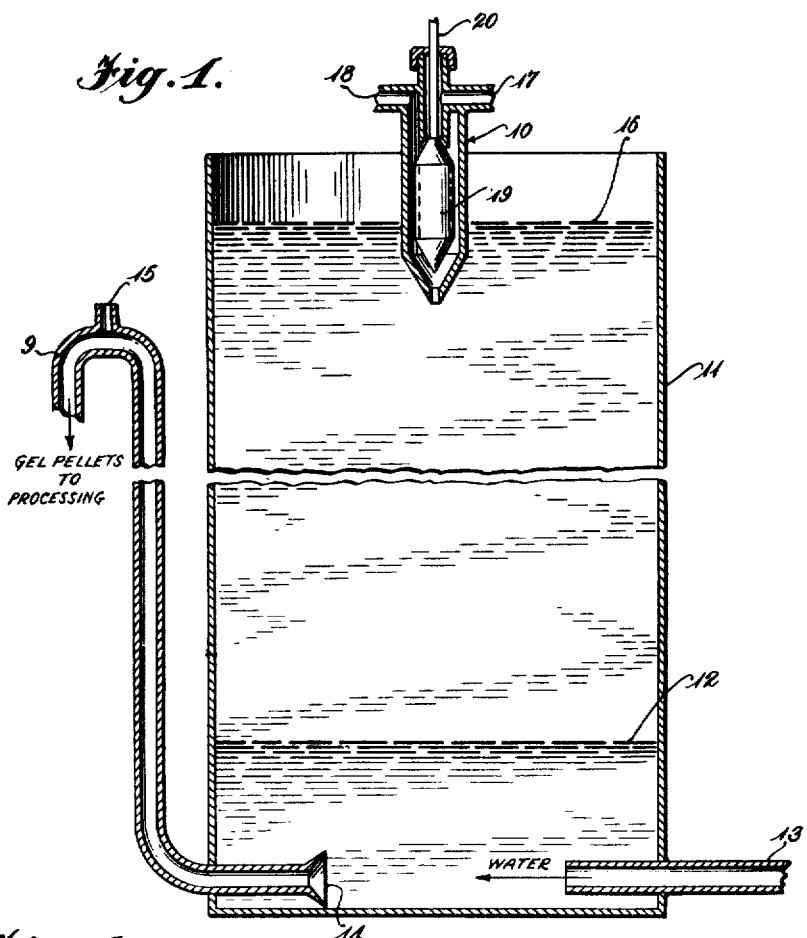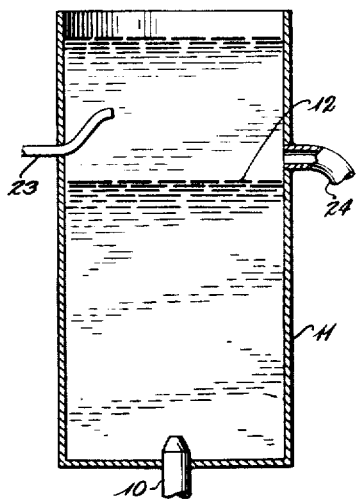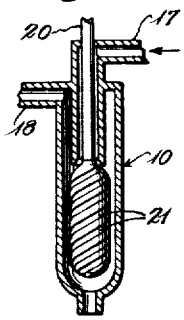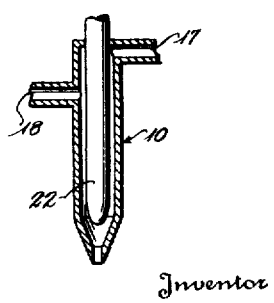

2,449,664

UNITED STATES PATENT OFFICE 2,449,664

PREPARATION OF SPHEROIDAL SILICA-ALUMINA GEL PARTICLES

Milton M. Marisic, Woodbury, N. J., assignor to Socony-Vacuum Oil Company, Incorporated, a corporation of New York Application April 19, 1944, Serial No. 531,815

1 Claim. (Cl. 252—317)

This invention relates to inorganic gels such as those comprising silica as a primary constituent and which also contain alumina.

Such gels have found wide use industrially for many purposes, such as, for example, catalysts for the cracking of heavy hydrocarbons to lighter material such as motor gasoline, aviation gasoline base stocks and the like. Precipitates of similar nature have also been found suitable for some of these uses and it is important in connection with the present invention to distinguish clearly between the two types of material. When silica is prepared for use as a cracking catalyst, an aqueous solution of a silicate, usually water glass, is acidified. Depending upon temperature and concentrations of the silicate solution and the added acid, silicic acid is thrown out of solution as a gelatinous precipitate during the addition of acid, or silicic acid remains in solution until the addition of acid is complete and then immediately or after a period of time sets to a firm gel which occupies the whole volume of the reactant solution. This invention is concerned only with the latter phenomenon and the formation of precipitates is carefully avoided.

For preparation of granular cracking catalysts and other forms of silica and alumina, wherein it is desirable that the finished dry gel be in a granular or pellet form of any desired size, the gel (or precipitate) has been shaped in pelleting or casting molds at some stage of the processing. While this gives granules of fair properties, they are entirely unsatisfactory for any process in which a moving (flowing) catalyst bed is employed since the surfaces are subject to wear and breakage and hence result in loss of the contact mass by gradual wearing away to dust or fines.

Another important factor is the acidity of the solution from which the gel is prepared. I have found that the gels derived by formation from solutions of high hydrogen ion content are much less effective for many purposes, particularly cracking of hydrocarbon oils, than are those from solutions of lower acidity. It is the primary object of this invention to provide a method for preparation of inorganic gels comprising silica and alumina from solutions of higher pH than those commonly used in the art and which may be formed into granules of unusually hard nature which are therefore capable of withstanding wear effects over long periods of normal use.

The present invention is concerned with the formation of the gel pellets of increased concentration of solid oxides by using sodium aluminate to supply the alumina content of the gel. This application is a continuation-in-part of my prior application Serial No. 461,455, filed October 9, 1942, now abandoned. Essentially, the invention contemplates achieving the objects stated by formation of a gel at pH of about 2.5 to about 10 from all metal compounds in the solution capable of being rendered insoluble under the conditions of the reaction; in other words, formation of precipitates is avoided. Preferably, the pH is between about 5 and 8.5. As a further condition to be met in the formation of gels having hard surfaces, the concentration of reactants must be such that the gel is not formed immediately. There must be a substantial time lapse between formation of the reactant solution and setting to a gel. The elapsed time to be provided for gel formation is determined by the means of forming the pellets or other shape in which the gel is to be used. According to a preferred process described in my said applications, the reactant solution is divided into portions corresponding in volume to that of the desired final forms, taking into account the shrinkage normally incident to syneresis and drying, and these portions are maintained separate until gelation takes place. Preferred methods of accomplishing that result are described hereinafter as injection of a gelable sol to a column of oil or other water-immiscible liquid. Another method that might be mentioned is to place drops of the reactant solution on a surface not wetted by water, which may be moving for continuous operation. Thus, drops of the solution may be placed on a flat wax surface or a wax-coated surface having depressions of a size correlated to that of the desired pellets. Whatever method of forming is employed, the solution will be made up in such manner that gelation will occur after separation of the solution into portions as outlined above and/or described in my copending application.

Vigorous agitation while mixing the ingredients of the solution to be gelled is essential. Unless the solutions added together to obtain the gelling solution are rapidly and efficiently mixed, precipitation will occur, giving a softer product which cannot be handled in the preferred manner. If the solution is stirred efficiently during mixing, there will be no precipitation when the gelation time is substantial.

For the purposes of more detailed discussion, a particular class of gels having high cracking efficiency will be considered. Those gels which comprise a major proportion of silica and a minor proportion of alumina, are highly active cracking catalysts. While it is within the contemplation of the invention to form a silica gel and impregnate the finished gel with aluminum salt, the preferred practice involves conjoint gelation to obtain a homogeneous catalyst. The amphoteric nature of aluminum introduces a complicating factor in pH control. I have found that account must be taken of the amphoteric metal as though it takes up alkali metals to form sodium aluminate. Further, aluminum is usually added as cations of water-soluble salts and the anions of those salts also take up alkali metal. Thus, the amount of acid required to produce the desired pH on mixing water glass, aluminum sulfate and acid, can be estimated simply by calculating the quantity of acid which will neutralize the residual $Na_2O$ content of the water glass after subtracting that amount which will form sodium aluminate and sodium sulfate from all the alumina and sulfate present. I have found that control of gelation time may be easily achieved in spite of the fact that it may not be concisely expressed in general terms. Gelation time is increased by dilution of the solution and by reduction in temperature. An increase in temperature of 10° C. may decrease the gelation time as much as 75%. It will be readily seen that, if slower gelation is desired, the solution may be diluted, the temperature lowered, or both.

Additional generalizations may be stated. As the pH of the reactant (gelling) solution is lowered beyond the limits expressed above, the activity of the gel as a cracking catalyst decreases substantially. The concentration of alumina, and certain other amphoteric oxides, may be correlated to pH. Increased amounts of alumina allow the pH to be decreased within the limits of the invention with comparable results.

The dried gels of this invention may be tempered, in the manner known in the art, by treatment with steam. The effect of steam is to reduce the drastic action of the catalyst tending to decompose the charging stock to coke and gas. In many cases, comparable results are obtained by washing the undried gel with hot water or treating the undried hydrogel with steam during the processing operation. A peculiar action of hot water has been noted in the more acid part of the range contemplated by the invention. Gels prepared at pH 2.5 to 5 are somewhat less active than others when processed in the normal manner involving washing with cold water to remove water-soluble salts. If, however, they are washed with hot water above 120° F., preferably 140° to 180° F., the activity is greatly increased. In some cases, only several washes with hot water are necessary, then, preferably, the gel is partially dried and the washing is continued with cold water.

The present application is predicated upon my discovery that gels of greatly increased product concentration can be formed by supplying alumina as sodium aluminate rather than as a salt in which the aluminum is the cation, e. g., aluminum sulfate. Other factors being equal, a gel formed by mixing an acid solution with a solution of water glass and sodium (or other alkali metal) aluminate may have a much greater concentration of water-insoluble oxides (silica and alumina) without precipitation than a gel formed by mixing water glass with acid containing an aluminum salt.

Other objects and advantages of the invention will become apparent in the detailed discussion of the invention in connection with the annexed drawings, wherein:

Figure 1 is a section through a preferred form of the apparatus;

Figure 2 shows a modified type of a mixing nozzle;

Figure 3 is an illustration of a very simple mixing nozzle; and

Figure 4 is a view of a modified form of apparatus according to the invention.

Referring to Figure 1, a mixing nozzle indicated generally at 10, is mounted at the top of a column of water-immiscible fluid in a tank 11. At the bottom of tank 11 is a layer of water which forms an interface 12 with the column of said fluid. Water is continuously supplied through inlet 13 and withdrawn through outlet 14. The interface at 12 is maintained by properly adjusting the height of conduit 9 in correlation with the density of the fluid medium and the rate at which water is supplied at 13. Vent 15 prevents siphoning action. The flow of water carries away the gel pellets through outlets 14 to 9 to suitable washing and treating stages. The water in which the pellets are carried away is itself a washing medium and may include any desired treating material to act as a treating stage.

The colloidal solution from which the pellets are formed is made up and admitted to the column of fluid by the mixing nozzle 10. Preferably, the apparatus will include a plurality of nozzles 10 in order to increase the capacity of the unit, but only one is shown here for purposes of simplicity. The nozzle 10 includes means for completely dispersing two solutions in each other and admitting a continuous stream of the so-formed colloidal solution below the surface 16 of the water-immiscible fluid, wherein the stream of the colloidal solution breaks up into globules. The colloidal solution or globules thereof may be dropped on the surface of the fluid but this tends to break them and impairs control over pellet size obtained by injecting the colloidal solution under the surface of the liquid. It must be borne in mind, that considerable shrinkage takes place, not only by syneresis, but also during drying and processing. Control of globule size must take into account this shrinkage.

The size of the globules is controlled by the rate at which the colloidal solution flows through the nozzle orifice and the dimensions of the latter. A simple modification in controlling the size of the globules is the introduction of a baffle just outside of the nozzle mixer and in the stream of the colloidal solution. Furthermore, sizing is a matter of relative densities and viscosities of the colloidal solution and water-immiscible liquid.

In the mixing nozzle 10, solutions to be mixed are metered accurately and then admitted through lines 17 and 18 to a chamber which has a rotor 19 rotated by shaft 20 at a speed of at least about 1700 R. P. M. from a source of power not shown. The rotor 19 is constructed from a rectangular bar of metal whose edges are rounded off in such manner that the walls of the mixing chamber serve as a guide for them. The rounded edges of the rotor are grooved; thus, efficient dispersion of both solutions in each other is maintained and gel formation is prevented in the mixing nozzle. The rotor may be fluted in any suitable manner or provided with other inequalities of surface to increase agitation in the mixing zone. Helical grooves for such purpose are shown on the rotor 21 of the modified form of mixing nozzle illustrated diagrammatically in Figure 2. The best operation of the mixing nozzle is realized when the rates of the reactant solutions are so high that the time the latter solutions spend in the mixing chamber is only a very small fraction of the gelation time.

A further modification is the extremely simple mixer of Figure 3, wherein the rotor 22 is merely a shaft which may be fluted, grooved, etc.

Another modification that may be applied to any of the mixing nozzles illustrated in Figures 1, 2 and 3 is to provide means for injecting air into the solutions admitted to the mixing chamber or to the mixing nozzle itself. By this means, hydrogel pellets are obtained which contain numerous small bubbles of air which serve to make the processed dry gel less dense in nature and more porous.

The apparatus of Figure 4 is adapted for upward flow of the colloidal solution during gelation. In this case, the mixing nozzle 10 is positioned at the bottom of the shell 11 which contains a column of water-immiscible liquid heavier than water, with water thereabove, the liquid-liquid interface being again indicated at 12. Water is admitted by a pipe 23 while water carrying gelled spheroids is withdrawn by discharge line 24.

A silica-alumina gel is prepared by adding a sodium silicate solution of the proper concentration to an efficiently stirred solution containing an acid and the desired quantity of an aluminum salt. The concentration of acid is such that after the liquids have been mixed to form a colloidal solution the pH of the solution is from 2.5 to 10; preferably between pH 5 and 8.5. The concentrations of the salts in the two solutions before mixing are adjusted so that when the liquids are mixed with efficient stirring no precipitation nor coagulation occurs; but after the solutions have been thoroughly mixed the whole volume of the liquid sets to a gel in a few seconds, a few minutes or longer, but preferably in less than thirty minutes. The gel thus formed will be referred to hereafter as the hydrogel.

The silica-alumina hydrogel may be prepared by employing a soluble aluminate such as sodium aluminate. The only variation in the above method is the order in which the reagents are mixed. The sodium aluminate solution of the proper concentration is mixed with a dilute solution of sodium silicate and immediately this liquid is added to an efficiently stirred acid solution. The same precautions are observed that were noted above in order that no precipitation occurs and that the hydrogel forms after the solutions have been thoroughly mixed.

It is proper to point out here that the silica-alumina hydrogel prepared as described above, possesses a homogeneous structure and a uniform composition, hence, it is unlike the gelatinous precipitate of silica alumina as obtained by methods previously used. When silica alumina is precipitated by adding a sodium-silicate solution to a solution containing an aluminum salt and an acid, the composition and the structure of the material precipitating is constantly changing as it is coming out of the solution.

The silica-alumina hydrogel prepared as described above may be processed by any one of the following procedures to prepare the finished catalyst. Generally, the hydrogel was not processed until syneresis of the gel was complete.

1. The hydrogel is broken into particles of predetermined size and washed with water until free of soluble salts. The hydrogel at this point is not pure silica alumina, but contains zeolitic sodium ions which are replaceable by other positive ions; hence, the hydrogel is washed with an ammonium salt, such as ammonium chloride, to replace the sodium ions by ammonium ions. The hydrogel is washed with ammonium chloride solution several times in order to insure substantially complete replacement of the sodium ions by ammonium ions. The hydrogel is finally washed with water several times to remove any excess of ammonium chloride that may be adsorbed on the gel. The washed hydrogel may be cast into molds so as to form pellets of any size or shape and then dried slowly at 180° to 250° F. in a current of air; or, the washed hydrogel may be dried under the conditions just given and then broken into particles of any desired size. The gel is further dried at about 1000° F. At this temperature the zeolitically combined ammonium ions are evolved as ammonia and the finished hydrated silica-alumina catalyst is obtained.

2. The silica-alumina hydrogel is partially dried with or without the aid of a current of air at 180° F. to any suitable water content such as 75%, 50% or 30%. Reducing the water content to less than 30% in some cases, results in a less efficient catalyst. The partially dried gel is washed with water and ammonium chloride solution as described in (1). The washed gel is broken into particles of any desired size and dried and heated at 1000° F. as described in (1).

3. If the catalyst is desired in a powder form or a pellet form, the gel is ground to a powder immediately after partial drying as described in (2) and then the powder is washed with water and ammonium chloride solution as described in (1). The washed powder is dried at 180° F. and pulverized again. This powder may be converted into pellets or it may be used in the powder form as a cracking catalyst. In either case, the silica-alumina gel is heated at 1000° F. to remove the zeolitically combined ammonium ions and to further dry the catalyst before being used in a catalytic operation.

The above procedures are those commonly used in the art at the present time and are better suited for use in a showing of comparative results. It is to be understood, however, that the hydrogel is preferably formed in relatively small portions as described hereinabove and then washed and dried.

The composition of the silica-alumina gel which yields the most efficient cracking catalyst depends upon the chemical and physical properties of the petroleum oil that is to be cracked. Generally, the ratio of silica to alumina in the catalyst which is most efficient for the cracking of a gas oil, is not satisfactory for the cracking of heavy stocks which contain a large proportion of high boiling hydrocarbons. Furthermore, for a given charge stock the ratio of silica to alumina yielding the most efficient catalyst is dependent upon the reagents used in preparing the hydrogel. For example, in cracking Oklahoma City gas oil over catalysts prepared from sodium silicate, aluminum sulfate and sulfuric acid, the best molecular ratios of silica to alumina were found between 15.3 and 22.6; while the gels obtained from sodium silicate, sodium aluminate and hydrochloric acid wielded most active catalysts at molecular ratios of silica to alumina of 11.9 to 15.6 when the same gas oil was employed in the cracking reaction.

For the polymerization of unsaturated hydrocarbons, the ratio of silica to alumina in the catalyst is much higher than in a cracking catalyst.

EXAMPLE I

A water-glass solution was prepared by diluting 1462 grams of "N" brand of sodium silicate (28.7% of $SiO_2$, 8.9% $Na_2O$) with four liters of distilled water. A second solution was prepared by dissolving 215 grams of $Al_2(SO_4)_3 \cdot 18H_2O$ in 7.5 liters of distilled water and adding to this solution 1.38 liters of 1.060 normal sulfuric acid. This acid solution was agitated by means of a mechanical stirrer and to it was added the water-glass solution. A clear solution resulted containing no precipitate. The pH of this colloidal solution was 7.5. Six minutes after the reagents were thoroughly mixed, the solution set to a firm gel. The hydrogel was broken into particles of about one inch in diameter and these were allowed to stand for two hours so as to permit the hydrogel to synerize. The gel was washed with distilled water until substantially free of sulfate ions and then was washed five times with a 5% solution of ammonium chloride in order to exchange the zeolitically combined sodium ions with ammonium ions. The gel was allowed to stand in the ammonium chloride solution for a sufficient length of time in order to permit complete diffusion of ammonium chloride into the gel.

Finally, the hydrogel was washed several times with distilled water to remove the excess ammonium chloride adsorbed on the gel. The hydrogel was dried slowly in a current of air at 180° F. to constant weight. The gel was then broken into particles of the desired size and heat treated for four hours at 1050° F. This material was an excellent catalyst for the cracking of petroleum hydrocarbons.

EXAMPLE II

Fourteen-hundred and sixty-two grams of "N" brand of sodium silicate (28.7% of $SiO_2$, 8.9% $Na_2O$) were diluted with four liters of distilled water and mixed with 2.2 liters of a solution containing 75 grams of sodium aluminate ($Na_2Al_2O_4$). An acid solution was prepared by diluting 4.30 liters of 0.978 normal hydrochloric acid with 4.2 liters of distilled water. The acid solution was agitated by means of a mechanical stirrer and to it was added the solution containing the sodium silicate and sodium aluminate. A clear colloidal solution resulted which had a pH of 8.0. One minute after the reagents were thoroughly mixed, the solution set to a gel. The hydrogel was broken into particles of about one inch in diameter and these were treated in the same manner as described in Example I, except that the initial water washes were continued until the hydrogel was substantially free of chloride ions since hydrochloric acid was used in this example instead of sulfuric acid.

The table below shows the data obtained in cracking a gas oil over the catalysts whose preparations are described in the above examples. These data should not be interpreted as representing absolute activities since they were obtained on a small scale operation; that is, in a laboratory-size cracking case. A larger cracking case or a commercial unit would produce much more gasoline than these data show. Considerable data are available to prove that the relative order of activities of cracking catalysts as obtained by this method is the same as that derived from a larger cracking unit.

For the cracking tests, Oklahoma City gas oil having an A. P. I. gravity of 35.8 and a boiling range from 471° to 708° F. was passed through the catalyst bed at 800° F. and at a liquid feed rate of 1.5 volumes per volume of catalyst per hour. The results in the tables below are based on the oil charged to the cracking case and are the average of at least four runs which were considered to be satisfactory checks.

Table 1

| Catalyst | Per cent Volume Gasoline 300° F. End Point | Per cent Volume Gasoline 410° F. End Point | Per cent Wt. Coke | Per cent Wt. Gas |
|---|---|---|---|---|
| Example I | 37 | 51 | 3.7 | 11.1 |
| Example II | 38 | 51 | 4.0 | 7.0 |
| Clay (best known) | 29 | 42 | 4.1 | 6.7 |

A comparison of the effects of hot and cold water washing and of pH of the reactant solution before gelation on gasoline yield is shown below. The yield is reported as percentage of 410° F. end point gasoline based on the charge stock.

Table 2

| Molecular Ratio of $SiO_2$ to $Al_2O_3$ in Gel | pH | Water Wash of Hydrogel | Gasoline Yield Percent |
|---|---|---|---|
| 22.5 | 0.27 | cold | 19 |
| 22.5 | 0.37 | do | 26 |
| 15.3 | 0.36 | do | 30 |
| 15.3 | 0.36 | hot | 22 |
| 9.6 | 0.32 | cold | 31 |
| 22.5 | 4.3 | do | 9 |
| 22.5 | 4.3 | hot | 45 |
| 22.5 | 4.3 | dried to 60% $H_2O$ content and then washed cold | 9 |

EXAMPLE III

7% $Al_2O_3$, 93% $SiO_2$ (on dry basis)

An acid solution was prepared by dissolving aluminum sulfate in dilute hydrochloric acid to form a solution containing 18.60 grams of HCl and 10.15 grams of $Al_2O_3$ per liter of solution. A sodium silicate solution was prepared by diluting "N" brand sodium silicate with water to an $SiO_2$ content of 105 grams per liter.

These two solutions were mixed at 70° F. in the mixing nozzle in the ratio of 100 cc. of the latter to 78.0 cc. of the former to form a sol having a pH of 6.0 and a gelation time of 20 seconds. The product concentration was 6.3. Sol extruded into oil to form beads, which were washed and dried in usual manner. The activity was 50% conversion of gas oil to gasoline of 410° F. end point.

EXAMPLE IV

7% $Al_2O_3$, 93% $SiO_2$ (on dry basis)

To 8000 cc. of a sodium-silicate solution prepared from "N" brand and containing 212.0 grams $SiO_2$ per liter were added with efficient mixing 5440 cc. of a sodium-aluminate solution containing 23.6 grams $Al_2O_3$ per liter. This solution was mixed at 70° F. in the nozzle mixer with a 3.375 normal sulfuric acid solution in the ratio of 67.20 cc. to 25.60 cc. of the acid to form a sol having a pH of 6.0 and a gelation time of 20 seconds. The product concentration was 9.65. The sol was extruded into oil to form hydrogel beads which were treated with water at 135° F. for 8 hours and then washed with cold water, base exchanged and dried. The activity was 47%.

I claim:

A process for preparing spheroidal particles of silica-alumina hydrogel having a high solids concentration which comprises mixing sodium silicate solution containing about 212 grams silicon dioxide per liter and sodium aluminate solution containing about 23.6 grams aluminum oxide per liter in a volume ratio of 8000 parts silicate solution to 5440 parts aluminate solution, mixing the resultant silicate-aluminate solution while agitating with an amount of acid giving a resultant pH of about 6.0, introducing the so formed hydrosol into a body of oil wherein it separates into spheroidal globules of hydrosol and maintaining said globules in said oil until they set to firm hydrogel spheroids.

MILTON M. MARISIC.

REFERENCES CITED

The following references are of record in the file of this patent:

UNITED STATES PATENTS

| Number | Name | Date |
| --- | --- | --- |
| 2,282,922 | Ahlberg et al. | May 12, 1942 |
| 2,386,810 | Marisic | Oct. 16, 1945 |

Certificate of Correction

Patent No. 2,449,664. September 21, 1948.

MILTON M. MARISIC

It is hereby certified that error appears in the printed specification of the above numbered patent requiring correction as follows:

Column 6, line 71, for the word "wielded" read *yielded*;

and that the said Letters Patent should be read with this correction therein that the same may conform to the record of the case in the Patent Office.

Signed and sealed this 10th day of May, A. D. 1949.

[SEAL]

THOMAS F. MURPHY,
*Assistant Commissioner of Patents.* base exchanged and dried. The activity was 47%.

I claim:

A process for preparing spheroidal particles of silica-alumina hydrogel having a high solids concentration which comprises mixing sodium silicate solution containing about 212 grams silicon dioxide per liter and sodium aluminate solution containing about 23.6 grams aluminum oxide per liter in a volume ratio of 8000 parts silicate solution to 5440 parts aluminate solution, mixing the resultant silicate-aluminate solution while agitating with an amount of acid giving a resultant pH of about 6.0, introducing the so formed hydrosol into a body of oil wherein it separates into spheroidal globules of hydrosol and maintaining said globules in said oil until they set to firm hydrogel spheroids.

MILTON M. MARISIC.

REFERENCES CITED

The following references are of record in the file of this patent:

UNITED STATES PATENTS

| Number | Name | Date |
| --- | --- | --- |
| 2,282,922 | Ahlberg et al. | May 12, 1942 |
| 2,386,810 | Marisic | Oct. 16, 1945 |

Certificate of Correction

Patent No. 2,449,664.  September 21, 1948.

MILTON M. MARISIC

It is hereby certified that error appears in the printed specification of the above numbered patent requiring correction as follows:

Column 6, line 71, for the word "wielded" read *yielded*;

and that the said Letters Patent should be read with this correction therein that the same may conform to the record of the case in the Patent Office.

Signed and sealed this 10th day of May, A. D. 1949.

[SEAL]

THOMAS F. MURPHY,
*Assistant Commissioner of Patents.*